United States Patent Office 3,634,289
Patented Jan. 11, 1972

3,634,289
PROCESS FOR RECLAIMING WOOD TREATING COMPOSITION
Harold G. Liddell, Angleton, Tex., assignor to The Dow Chemical Company, Midland, Mich.
No Drawing. Filed Sept. 25, 1969, Ser. No. 861,183
Int. Cl. C09k 3/00
U.S. Cl. 252—404          4 Claims

ABSTRACT OF THE DISCLOSURE

A process for recovering a wood preservative, e.g., pentachlorophenol, and its carrier from a treating composition which composition, through usage, has accumulated contaminates, wood rosins, dirt, etc. along with a process for reduction of corrosion of containers used for storing the carrier-preservative composition which includes: reacting the contaminated treating composition with an aqueous solution of an alkali metal base, e.g., $Na_2CO_3$ or NaOH, in an amount sufficient to convert the preservative, e.g., pentachlorophenol, to its water-soluble alkali metal salt form; allowing the water and the salt to separate from the carrier and the contaminants, and decanting the aqueous-layer containing the preservative in its salt form from the carrier and contaminants; subjecting the carrier and contaminants remaining after decantation to distillation to recover the volatile carrier (the contaminants, the dirt, and the rosins will remain behind in the residue); mixing clean distilled carrier with the decanted aqueous layer and sufficient acid to convert the salt to the solvent-soluble acid form, thereby to recover the preservative in solution in the carrier; finally, decanting the water after settling of the newly constituted treating composition. Alternatively, the preservative may be regenerated by acid from the water, separated from the water and then mixed with the clean solvent. Generally not all of the salt form of the preservative will be converted and certainly not all of the water will be removed from the carrier, thus when the clean treating composition, containing the carrier and the preservative, is stored, some of the salt form of the preservative as well as water will be present and form an aqueous layer over the carrier upon standing as during storage. It has been found that this aqueous layer containing some of the preservative in its salt form will prevent the corrosion of the metal container or vessel at the most corrosive point, the interface of the solvent and water.

BACKGROUND OF INVENTION

The recent advent of the use of the halogenated solvents as carriers for treating wood with preservatives, such as pentachlorophenol, has necessitated the recovery of the solvent and the preservative from the contaminated treating composition to enable the process to be operated in an economical manner. The treating composition picks up wood rosins, dirt, particles of wood, grease, etc. which must be removed periodically to avoid staining the wood being treated. Mere distillation, while recovering the solvent in a clean condition, leaves the preservatives, such as pentachlorophenol, behind in the residue, a loss which cannot be tolerated.

In addition the halogenated solvent-pentachlorophenol treating composition will always have some water associated with it and upon standing, as during storage between cycles, the water will separate in a layer above the treating composition. This interface is a potential source of corrosion.

Therefore, it is an object of the present invention to provide a process for recovery of the preservative such as pentachlorophenol and the carrier along with the prevention of corrosion of the metal container which comes into contact with the treating composition and associated water. A further objective is to provide a process which materially reduces the non-biodegradable pollutants which must be discarded.

BRIEF DESCRIPTION OF INVENTION

In accordance with the present invention, a wood treating composition, containing a halogenated hydrocarbon as the principal carrier and a wood preservative, such as pentachlorophenol, which has become contaminated with wood rosins, dirt, etc. can be cleaned up, e.g., the solvent and preservative recovered in a clean reusable condition. The technique employed also provides corrosion protection for the storage vessel in contact with the treating composition. The first step in carrying out the process of the present invention is to mix the contaminated or used carrier-preservative composition with an aqueous solution of an alkali metal base, such as, for example, sodium hydroxide or sodium carbonate, in an amount sufficient to react with all or substantially all of the preservative to form the alkali metal salt thereof. The resulting mixture is allowed to stand to permit the salt, which is soluble in the water but not the carrier, and water to layer-out above the carrier. This aqueous layer is then decanted to remove the salt and water from association with the carrier and contaminants. The salt and water mixture is then either acidified to recover the preservative in its water-insoluble acid form from the water or merely set aside for future mixing with clean carrier and acidification after mixing to convert the preservative into carrier-soluble water-insoluble form.

After separation of the salt and water mixture from the carrier, the carrier is distilled to recover the carrier free of rosin, etc. The residue from the distillation can be discarded.

The next step in the process is to mix either the free acid form of the preservative with the clean carrier to regenerate a treating composition or to mix the salt and water layer with the solvent, acidify the mixture and remove the water from above the carrier-preservative after standing. Of course, additional preservative must be added from time to time to maintain the desired strength of preservative in the treating composition.

The carrier-preservative composition will always contain some water. The water is picked up from the wood, the steaming step to recover the carrier from the wood after treatment, as well as the preservative and carrier recovery and clean-up process just described. The water, during storage of the treating solution, will rise to the surface of the solution. Such a layer of water, while exhibiting a corrosive nature to the metal containers is advantageous since it substantially prevents the evaporation of the carrier from the treating solution surface during storage. It has now been found that the corrosive nature of the water; particularly at the water solvent interface, can be materially reduced by maintaining a quantity, 0.001 to about 5% by weight, of the alkali metal salt of the preservative, e.g., sodium pentachlorophenate, dissolved in the water. The corrosive nature of the water which circulates through the wood treating process is greatly increased by the acidic conditions which develop through extractions of acids from the wood as well as products attendant with solvent degradation such as HCl, which is more soluble in the water than the solvent. By maintaining a quantity of the sodium salt of the preservative in the aqueous phase over-laying the treating solution, any such acids are neutralized with the attendant release of the preservative in the acid form which transfers to the carrier. Thus, there is provided a system by which corrosion is prevented or at least reduced and which simultaneously reduces the loss of preservative to water in the clean-up process.

DETAILED DESCRIPTION OF INVENTION

Example 1

To determine the effectiveness of the preservative recovery process, a 200 ml. of a 4.6 percent by weight solution of pentachlorophenol in methylene chloride was shaken with 200 mls. of an aqueous 5% by weight solution of $Na_2CO_3$ for a few minutes. The mixture was set aside to permit separation of the water from the methylene chloride. The water layer was decanted from the methylene chloride layer. The water contained substantially all of the pentachlorophenol as the sodium salt. The water-salt solution was acidified with 10% hydrochloric acid until the solution became acidic to litmus paper. A precipitate formed which settled to the bottom. The resulting precipitate and water were shaken with 200 ml. of fresh methylene chloride which dissolved the precipitate in it. The resulting mixture was set aside whereupon the aqueous layer which formed separated and was decanted. The methylene chloride was analyzed and found to contain substantially all of the pentachlorophenol. In a similar experiment, analysis of the methylene chloride after separation of the aqueous layer and "penta" showed only about 0.4% "penta" remaining in the solvent. Thus, about 80% of the penta is recoverable.

In a commercial scale operation, after between about fifty and one hundred cycles, a part of the spent treating solution was pumped into a mixing container where an aqueous 5% $Na_2CO_3$ solution is mixed therewith. The resulting mixture was allowed to settle and the solvent pumped off leaving the water layer which forms. The water was acidified with about 10% HCl. The solvent which had been removed was distilled and the solvent condensate remixed with the acidified water. This mixture was allowed to settle and the solvent layer containing the pentachlorophenol pumped to storage. Substantially all of the pentachlorophenol in the treating solution portion taken for recovery was found in the cleaned solvent.

Example 2

The following tests were run to determine the corrosion rate of a treating solution storage tank both in the aqueous layer over the treating solution and the treating solution.

Coupons of mild steel having an area of 0.0017 $m^2$ were suspended into the liquids through an opening in the top of the tank. The coupons were maintained in their respective positions for seven (7) days or twenty-six (26) days.

COUPONS IN WATER LAYER

Coupon 1

Wt. of coupon before treatment _____ 4.2800 ⎫
Wt. of coupon after treatment _____ 4.2717 ⎪
Wt. loss _____ 0.0083 ⎬ 1 week
Wt. loss from blanks _____ 0.0006 ⎪
Actual wt. loss _____ 0.0077 ⎭
Mils/year=1.18.

Coupon 2

Wt. of coupon before treatment _____ 4.0627 ⎫
Wt. of coupon after treatment _____ 3.9847 ⎪
Wt. loss _____ 0.0880 ⎬ 26 days
Wt. loss from blanks _____ 0.0006 ⎪
Actual wt. loss _____ 0.0874 ⎭
Mils/year=3.62.

Upper portion of coupon was pitted and rough after cleaning.

Coupon 3

Wt. of coupon before treatment _____ 5.4551 ⎫
Wt. of coupon after treatment _____ 5.4017 ⎪
Wt. loss _____ 0.0534 ⎬ 26 days
Wt. loss from blanks _____ 0.0006 ⎪
Actual wt. loss _____ 0.0528 ⎭
Mils/year=2.18.

Coupon had one badly pitted place near the top of the coupon.

Average of two 26 day tests mils/year=2.90.

COUPONS IN TREATING SOLUTION

Coupon 4

Wt. of coupon before treatment _____ 4.2003 ⎫
Wt. of coupon after treatment _____ 4.1928 ⎪
Wt. loss _____ 0.0075 ⎬ 26 days
Wt. loss from blanks _____ 0.0006 ⎪
Actual wt. loss _____ 0.0069 ⎭
Mils/year=1.06.

Coupon 5

Wt. of coupon before treatment _____ 4.2979 ⎫
Wt. of coupon after treatment _____ 4.2902 ⎪
Wt. loss _____ 0.0077 ⎬ 26 days
Wt. loss from blanks _____ 0.0006 ⎪
Actual wt. loss _____ 0.0071 ⎭
Mils/year=1.09.

Average of two day tests mils/year=1.075.

Another series of tests with and without sodium pentachlorophenate was run.

The various test solutions were placed in 16 oz. bottles and exposed to the atmosphere during the test period. Mild steel coupons with an area of 0.0017 $m^2$ were used to obtain the corrosion rate.

The coupons were placed in the solutions and maintained therein for about 24 days.

Note that in tests numbered II and IV which contain the sodium pentachlorophenate the corrosion rate is appreciably less.

| | I. 250 gms. $H_2O$ only | | II. 250 gms. of a 1% solution of sodium pentachlorophenate in water | | III. 250 mls. of 4.56% solution of pentachlorophenol in methylene chloride plus 240 gms. water | | IV. 250 mls. of 4.56% solution of pentachlorophenol in methylene chloride plus 240 gms. of a 1% sodium pentachlorophenate solution | |
|---|---|---|---|---|---|---|---|---|
| | Coupon No. 1 | Coupon No. 2 | Coupon No. 1 | Coupon No. 2 | Coupon No. 1 | Coupon No. 2 | Coupon No. 1 | Coupon No. 2 |
| Wt. of coupon before treatment | 4.3656 | 4.2665 | 4.2591 | 3.9850 | 4.3862 | 4.2821 | 4.3654 | 4.7371 |
| Wt. of coupon after treatment | 4.2804 | 4.1777 | 4.2581 | 3.9841 | 4.3631 | 4.2591 | 4.3647 | 4.7364 |
| Wt. loss | 0.0852 | 0.0888 | 0.0010 | 0.0009 | 0.0231 | 0.0230 | 0.0007 | 0.0007 |
| Wt. loss from blanks | 0.0003 | 0.0003 | 0.0003 | 0.0003 | 0.0003 | 0.0003 | 0.0003 | 0.0003 |
| Actual wt. loss | 0.0847 | 0.0885 | 0.0007 | 0.0006 | 0.0228 | 0.0227 | 0.0004 | 0.0004 |
| Mils/year | 3.85 | 4.02 | 0.03 | 0.027 | 1.03 | 1.03 | 0.018 | 0.018 |

I claim:
1. A process for recovering a wood preservative from a contaminated treating solution comprised of an organic halogenated hydrocarbon carrier in which the acid-form of said wood preservative is soluble, said wood preservative in its acid-form, and contaminating wood rosin, dirt and the like which comprises
reacting the preservative in the contaminated carrier with an aqueous alkali metal base to convert the preservative from its acid-form, soluble, in the carrier, to its salt-form, soluble in water;

separating the aqueous phase from the organic phase;
distilling the carrier from the contaminants;
acidifying the aqueous phase to convert the preservative to its carrier-soluble form;
combining the aqueous phase with the carrier; and
separating the aqueous phase from the organic phase.

2. In the process of claim 1 wherein the carrier is methylene chloride.

3. In the process of claim 1 wherein the preservative is pentachlorophenol.

4. A process for recovering a wood preservative from a contaminated treating solution comprised of an organic halogenated hydrocarbon carrier in which the acid-form of said wood preservative is soluble, said wood preservative in its acid-form, and contaminating wood rosin, dirt and the like which comprises
  reacting the preservative in the contaminated carrier with an aqueous alkali metal base to convert the preservative from its acid-form, soluble in the carrier, to its salt-form, soluble in water;
  separating the aqueous phase form the organic phase;
  distilling the carrier from the contaminants;
  recombining the aqueous phase with the carrier;
  acidifying the resulting mixture to convert the preservative to its carrier-soluble form; and,
  separating the aqueous phase from the organic phase.

References Cited

UNITED STATES PATENTS

| | | | |
|---|---|---|---|
| 2,182,080 | 12/1939 | Hatfield | 117—149 X |
| 2,755,307 | 7/1956 | Nicolaisen | 260—623 R |
| 3,320,325 | 5/1967 | Widiger | 260—623 R |
| 2,595,516 | 5/1952 | Daughty et al. | 260—627 |

FOREIGN PATENTS

| | | | |
|---|---|---|---|
| 210,542 | 1/1967 | Sweden | 252—380 |
| 584,662 | 10/1959 | Canada | 260—623 R |
| 699,207 | 11/1953 | Great Britain | 117—149 |

NORMAN YUDKOFF, Primary Examiner

J. SOFER, Assistant Examiner

U.S. Cl. X.R.

21—7; 117—116, 149; 252—380; 203—37

PO-1050
(5/69)

UNITED STATES PATENT OFFICE
CERTIFICATE OF CORRECTION

Patent No. 3,634,289      Dated January 11, 1972

Inventor(s) Harold G. Liddell

It is certified that error appears in the above-identified patent and that said Letters Patent are hereby corrected as shown below:

Column 4, line 38, after "two" insert -- 26 --.

Column 4, in the table, Test No. III, change "4,56%" to read -- 4.56% --.

Column 5, Claim 4, line 21, delete "form" and insert -- form --.

Signed and sealed this 25th day of July 1972.

(SEAL)
Attest:

EDWARD M. FLETCHER, JR.      ROBERT GOTTSCHALK
Attesting Officer      Commissioner of Patents